US010831706B2

(12) United States Patent
Hoobler, III et al.

(10) Patent No.: US 10,831,706 B2
(45) Date of Patent: Nov. 10, 2020

(54) DATABASE MAINTENANCE USING BACKUP AND RESTORE TECHNOLOGY

(71) Applicant: International Business Machines Corporation, Austin, TX (US)

(72) Inventors: Delbert B Hoobler, III, Horseheads, NY (US); Lu Nguyen, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 15/045,106

(22) Filed: Feb. 16, 2016

(65) Prior Publication Data
US 2017/0235745 A1    Aug. 17, 2017

(51) Int. Cl.
*G06F 16/11*    (2019.01)
*G06F 16/182*    (2019.01)
*G06F 16/22*    (2019.01)
*G06F 11/14*    (2006.01)

(52) U.S. Cl.
CPC ........ *G06F 16/128* (2019.01); *G06F 11/1448* (2013.01); *G06F 11/1469* (2013.01); *G06F 16/182* (2019.01); *G06F 16/2282* (2019.01); *G06F 2201/80* (2013.01); *G06F 2201/84* (2013.01)

(58) Field of Classification Search
CPC ......... G06F 17/30088; G06F 17/30194; G06F 16/128; G06F 16/182; G06F 16/2282
USPC ......................................................... 707/639
See application file for complete search history.

(56) References Cited

U.S. PATENT DOCUMENTS

| | | | |
|---|---|---|---|
| 6,226,651 B1 * | 5/2001 | Masuda | G06F 11/1471 |
| 6,256,773 B1 * | 7/2001 | Bowman-Amuah | G06F 8/71 |
| | | | 707/999.202 |
| 6,324,647 B1 * | 11/2001 | Bowman-Amuah | |
| | | | H04L 63/0227 |
| | | | 709/223 |
| 7,139,999 B2 * | 11/2006 | Bowman-Amuah | |
| | | | G06Q 10/06 |
| | | | 717/101 |
| 7,200,625 B2 | 4/2007 | Chiang et al. | |
| 7,200,626 B1 | 4/2007 | Hoang et al. | |
| 7,644,112 B2 * | 1/2010 | Blea | G06F 16/27 |
| | | | 707/999.204 |
| 7,707,184 B1 * | 4/2010 | Zhang | G06F 11/1435 |
| | | | 707/645 |
| 7,730,446 B2 * | 6/2010 | Anonsen | G06Q 10/10 |
| | | | 717/104 |

(Continued)

*Primary Examiner* — Mark E Hershley
(74) *Attorney, Agent, or Firm* — Jeffrey S LaBaw; Robert Sullivan; Feb R Cabrasawan

(57) ABSTRACT

A method, apparatus and computer program product for performing database maintenance. A database running in a computer includes a first data file and a first log file. A snapshot copy of the first data file is created. Database maintenance is performed on the first snapshot copy of the first data file to produce a maintained snapshot copy of the first data file. A snapshot restore operation is performed on the database by replacing the first data file with the maintained snapshot copy of the first data file. The maintained snapshot copy of the first data file is updated according to logged transactions in the first log file which occurred after the snapshot copy of the first data file was created. In this way, a new data file is created which is both a product of the database maintenance as well as the database transactions which occurred while the database maintenance occurred.

20 Claims, 5 Drawing Sheets

(56) References Cited

U.S. PATENT DOCUMENTS

| | | | |
|---|---|---|---|
| 7,778,976 B2* | 8/2010 | D'Souza | G06F 16/283 707/665 |
| 7,987,157 B1 | 7/2011 | Hsiung et al. | |
| 7,996,636 B1* | 8/2011 | Prakash | G06F 3/0619 711/162 |
| 8,250,033 B1* | 8/2012 | De Souter | G06F 16/1734 707/637 |
| 8,285,758 B1* | 10/2012 | Bono | G06F 17/30079 707/822 |
| 8,392,461 B2* | 3/2013 | Brown | G06F 16/217 707/792 |
| 8,548,955 B1* | 10/2013 | Meinsen | G06F 11/1458 707/674 |
| 8,874,519 B1* | 10/2014 | Payne | G06F 16/21 707/640 |
| 9,274,907 B1* | 3/2016 | Bachu | G06F 11/1458 |
| 9,720,951 B2* | 8/2017 | Yancey | G06F 16/2343 |
| 2003/0237081 A1* | 12/2003 | Taylor | G06F 8/65 717/168 |
| 2004/0117572 A1* | 6/2004 | Welsh | G06F 11/1451 711/162 |
| 2004/0133602 A1* | 7/2004 | Kusters | G06F 3/061 |
| 2005/0278397 A1* | 12/2005 | Clark | G06F 11/1458 |
| 2006/0047932 A1* | 3/2006 | Anderson | G06F 11/1469 711/162 |
| 2006/0047997 A1* | 3/2006 | Anderson | G06F 11/1469 714/4.1 |
| 2006/0206544 A1* | 9/2006 | Oks | G06F 11/1458 |
| 2006/0253500 A1* | 11/2006 | Kapur | G06F 16/273 |
| 2007/0143563 A1* | 6/2007 | Pudipeddi | G06F 3/0607 711/173 |
| 2007/0168692 A1* | 7/2007 | Quintiliano | G06F 11/1662 714/4.1 |
| 2007/0260830 A1* | 11/2007 | Faibish | G06F 3/067 711/162 |
| 2008/0086640 A1* | 4/2008 | Voss | H04L 51/00 713/171 |
| 2008/0177994 A1* | 7/2008 | Mayer | G06F 9/4418 713/2 |
| 2008/0184219 A1* | 7/2008 | Matsumoto | G16H 40/40 717/170 |
| 2008/0270719 A1* | 10/2008 | Cochran | G06F 11/1435 711/162 |
| 2010/0036851 A1* | 2/2010 | Paterson-Jones | G06F 17/30067 707/636 |
| 2011/0246419 A1* | 10/2011 | Yancey | G06F 11/14 707/624 |
| 2012/0101991 A1* | 4/2012 | Srivas | G06F 16/1844 707/623 |
| 2014/0068040 A1* | 3/2014 | Neti | G06F 9/485 709/223 |
| 2014/0108352 A1* | 4/2014 | Ahrens | G06F 11/1451 707/645 |
| 2016/0117228 A1* | 4/2016 | Farlee | G06F 11/1471 714/19 |
| 2017/0116220 A1* | 4/2017 | Wong | G06F 11/1446 |

* cited by examiner

DATABASE MAINTENANCE USING BACKUP AND RESTORE TECHNOLOGY

BACKGROUND OF THE INVENTION

Technical Field

This disclosure relates generally to database maintenance. More particularly, it relates to database maintenance using backup and restore technology.

Background of the Related Art

Databases are organized collections of information integral to the use of computer systems for many applications. Modern databases are typically optimized for transactional performance. When a transaction comes in, the data is written to the database in a manner that results in the quickest storage. The storage location is usually not sequential with related data or the most space-efficient location for the overall database. Over time, the database can become badly defragmented. This problem is similar to file system defragmentation, but can be even worse, because even empty space in databases takes storage space. A database defragmentation operation may reduce the size of database file by as much as 90%. Furthermore, there may be occasional logical or physical corruption in the database tables or files, due to disk errors or other errors. For these and other reasons, databases need periodic maintenance operations. Some maintenance operations can be done online, but a significant amount of database maintenance must still be performed offline.

Unfortunately, in many mission critical applications, databases can be required to be operational more than ninety-nine percent of the time, so there is minimal opportunity to perform offline database maintenance. Shutting down and restarting a large database might take an hour or more in some cases. As database sizes grow to 1 TB and beyond, maintenance operations can take twenty-four hours or more. Understandably, some users forgo maintenance for years. After such a long period, when the users are finally forced to restore the database, they find that their databases, and thus their backups, are corrupt.

In the near future, it is unlikely that the need for offline maintenance will be eliminated, and in fact is likely to grow. Therefore, there exists a need to improve offline maintenance processes, so that they can be completed as quickly as possible to minimize database disruption.

BRIEF SUMMARY

According to this disclosure, a method, apparatus and computer program product for performing database maintenance. A database running in a computer includes a first data file and a first log file. A snapshot copy of the first data file is created. Database maintenance is performed on the first snapshot copy of the first data file to produce a maintained snapshot copy of the first data file. A snapshot restore operation is performed on the database by replacing the first data file with the maintained snapshot copy of the first data file. The maintained snapshot copy of the first data file is updated according to logged transactions in the first log file which occurred after the snapshot copy of the first data file was created. In this way, a new data file is created which is both a product of the database maintenance as well as the database transactions which occurred while the database maintenance occurred.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, in preferred embodiments of the invention, the present invention employs snapshot and roll forward technology to improve database maintenance. The invention takes a snapshot backup of the database and performs the database maintenance on the snapshot copy. Meanwhile the production copy of the database continues to accept user requests and perform transactions as normal. Once the database maintenance is completed on the snapshot copy, the invention "snapshots" the maintained snapshot copy back to the production copy, thereby replacing the production copy, and applies the transactions that occurred during the maintenance on the maintained snapshot copy.

Using the invention, database downtime for maintenance is reduced from hours to only seconds or minutes. Once the database maintenance is accomplished, there is less data to back up and store. The restore of the maintained snapshot copy is a faster restore, then say a database backup which had not been maintained, as only the data portion is restored; the invention does not restore the empty space of the database which existed in the production copy prior to maintenance. The database errors are corrected without taking the database system offline; individual databases are dismounted to do maintenance. It is much faster to dismount and mount a database than to stop the database service.

Figure 1:
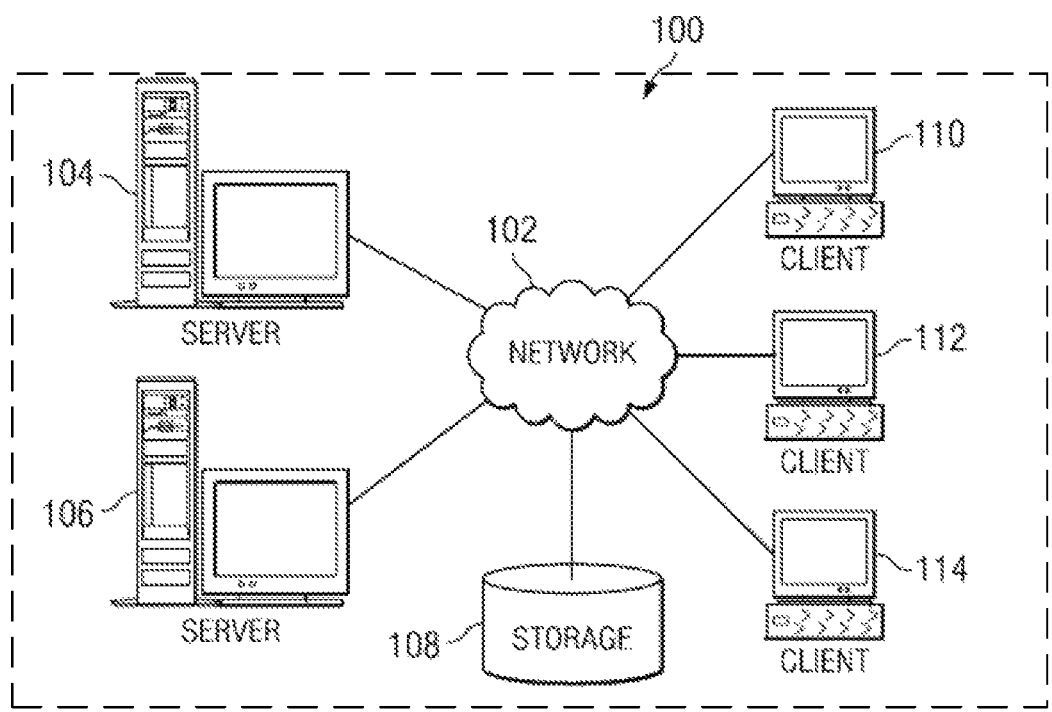
FIG. 1 depicts an exemplary block diagram of a distributed data processing environment in which exemplary aspects of the illustrative embodiments may be implemented.
Figure 2:
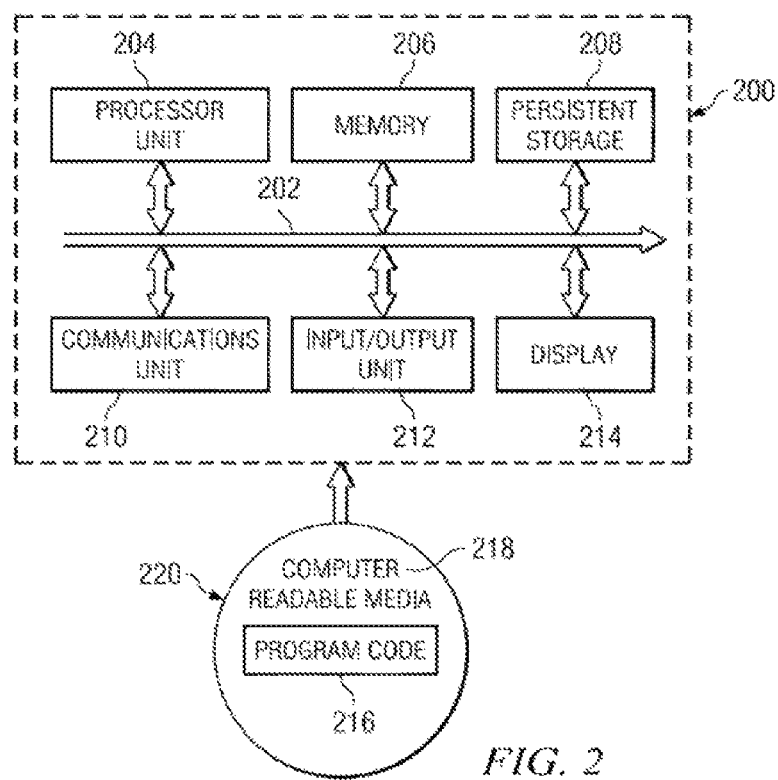
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
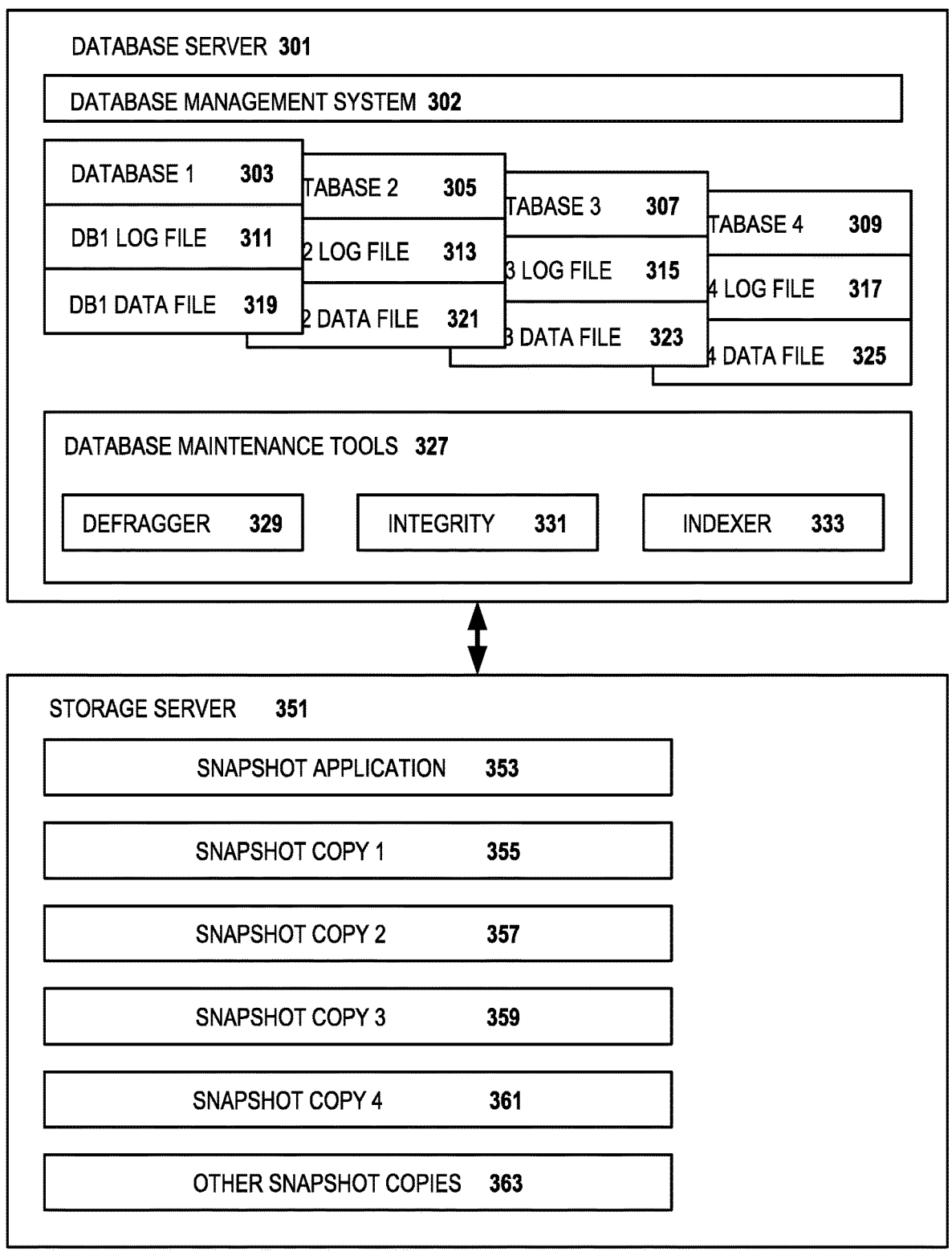
FIG. 3 illustrates an exemplary computing architecture in which the disclosed subject matter may be implemented.

FIG. 3 illustrates an exemplary computing architecture in which the disclosed subject matter may be implemented. The database server 301 and database management system 302 which is resident thereon are executing a plurality of databases. As shown, database 1 303, database 2 305, database 3 307 and database 4 309 are resident on database server 301. Four databases are shown for the sake of simplicity, however, the number of databases operated by the database server can be greater and is largely limited by the capacity of the systems on which they are resident as well as the performance needed by the applications which use the databases.

Each of the databases is composed of several files, including a log file and a data file. As is known to one skilled in the art, a log file is a file in which the database transactions are recorded. A data file is the main data file in which the data for the database is stored. The data file is broken up into a plurality of data files in many databases, but a single data file is shown for ease in illustration. The actual data in the databases is typically stored in pages referenced by the data file. As user transactions continue to be committed to the database, the data file becomes more fragmented, convoluted and layered, and in need of database maintenance.

The log file is a sequential description of the actions which the user(s) take on the database. Like the data file, some databases break the log file into many sequential log files. The log file has many uses. For example, it can be used to store a transaction before (or after) it is written to the data file as well as to check the integrity of the data file. In the case of a system crash, the log file is used to reconcile the state of the data file. In many cases, a transaction is written to the log file before it is committed to the data file since a user can make many, sometimes contradictory, changes to the same data. In some databases, it can be more efficient to store a transaction in the log file prior to making a change to the data file. Other terms for the log file include transaction log, database log or audit trail file. In one preferred embodiment, an entry in the log file comprised of a time stamp, a log sequence number which is a unique ID for a log record, a link to their last log entry, a transaction ID number which is a reference to the database transaction generating the log record, type of database log record and information about the actual database changes that triggered the log record to be written. As shown, database 1 303 is composed of log file 311 and data file 319, database 2 305 is composed of log file 313 and data file 321, database 3 307 is composed of log file 315 and data file 323 and database 4 309 is composed of log file 317 and data file 325.

Typically, transactions committed to the data file and stored within the log file can be compared by referring to header information in the data file containing transaction information. Those skilled in the art will recognize that the actual means of reconciling and matching transactions between the data file and log file will vary according to the database system.

Also resident on the database server 301 are database maintenance tools 327. The Database maintenance tools 327 may be part of the database management system 302 in alternative embodiments. Exemplary database maintenance tools include defragger 329, database integrity tool 331 and indexer 333. When defragmenting a database, the defragger will reorder the blocks so that sequential blocks are contiguous. It will also compact (remove) the empty space. Without defragmentation, overall performance of the database may be degraded, and it may continue to grow and use space unnecessarily. In an integrity check, a utility will make sure that the database pages are correct, using checksum and other techniques. If there is an error, the tool will correct it. Without an integrity check, a data corruption occurring in one part of the database may increase until that part of the database (or the entire database) can no longer be used. Also, a user will not know that their backup of the database is corrupt until it is too late. One skilled in the art will appreciate that other database maintenance tools exist, either incorporated as part of the database management system 302 or as a stand alone utility.

The system also includes a storage server 351, on which is resident a snapshot application 353 which creates "snapshots" from an original source, e.g., such as a database, and a set of snapshot collections 355-363. A "snapshot" is a known means of replicating a data record at a specific point in time. As compared to other backup methods, a snapshot can be created while the source record continues its normal activities without affecting the snapshot. Snapshots are commonly used for backups and to restore the original data records in the event of corruption or user mistakes such as accidental file deletion. When a snapshot is used for recovery purposes, the contents of the data record are restored from the snapshot, essentially returning the data record to the point in time that the snapshot was created. Multiple snapshots can be taken of a single data record.

Snapshot records 355-361 represent respective collections of snapshot copies taken at different points in time for databases 1-4 so that the administrator can return the database to a particular point in time. Some snapshot technologies store subsequent snapshots only as a delta of the changes from, plus a pointer to, a base snapshot. The snapshots in some technologies are exact copies of the original data record; in other technologies, the snapshots include a set of pointers or metadata pointing to the locations of the stored data which comprises the record. In the case of databases used in preferred embodiments of the invention, the snapshot is a view of the data file as it existed when the database was created, minus any uncommitted transactions.

As shown, database server 301 and storage server 351 are separate systems in the network, and can be systems similar to those described above in connection with FIGS. 1 and 2. However, one skilled in the art will appreciate that in alternative embodiments, the database server 301 and storage server 351 could be the same machine, i.e. applications running on the same system. In yet other embodiments of the invention, the database management system 302 and database maintenance tools 327 could be running on a different system than the system that the databases run on.

Figure 4:
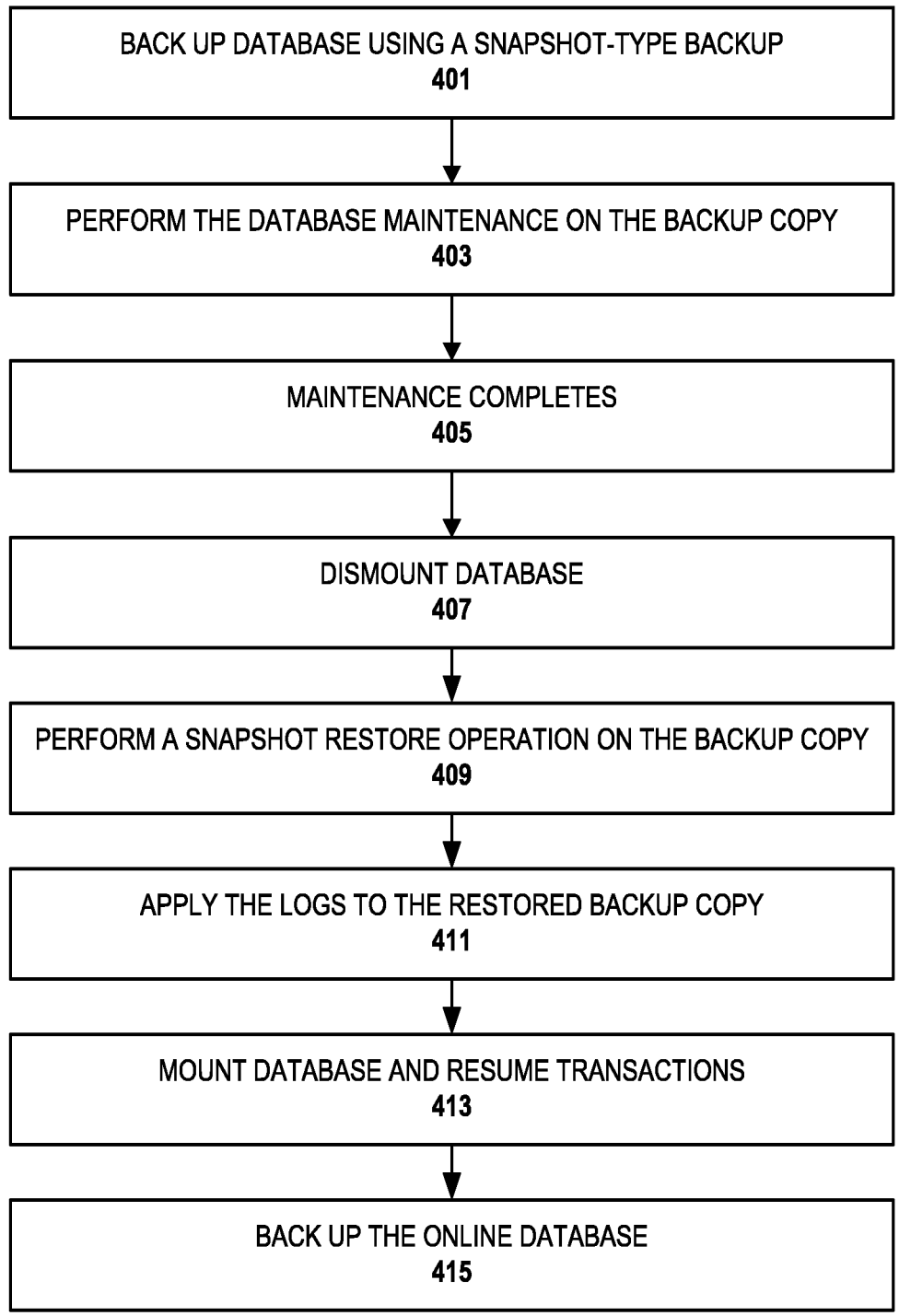
FIG. 4 is a flow diagram of a preferred embodiment of the invention.

FIG. 4 is a high level flow diagram of a preferred embodiment of the invention. In this embodiment, at a regularly scheduled time, for example, once a week or once a month, the database administrator wants to perform offline database maintenance. For example, the administrator needs to defrag the database, re-index a table, and re-organize another table within the database. Before the procedure, in the exemplary embodiment, database DB1 at time 1:00 consists of data file, File1 and transaction log file, Log1.

As shown in step 401, the system backs up database DB1 using a snapshot-type backup. In preferred embodiments, this is accomplished by having the database management system issue commands to the snapshot application to create a new snapshot. In the embodiment, the snapshot application is used to create snapshots which are used for normal backup. That is, the snapshot application is used both for the database maintenance process of the present invention as well as normal backup. Using the snapshot technology, the database is not halted for an extended period. Typically, during the snapshot process, writes to the database are held for fewer than 10 seconds. After this step, the snapshot backup contains the data file, File1', and, optionally, transaction log file, Log1'.

In step 403, the database maintenance is performed on the snapshot backup copy of the data file, i.e. on File1'. The production copy of the database (File1) is unaffected and continues accepting user transactions as normal. In preferred embodiments, database maintenance is not performed on the snapshot of the transaction log file, Log1' as most types of data problems are present in the data file. However, in alternative embodiments of the invention, database maintenance such as an integrity check is performed on the log file. In those embodiments of the invention in which database maintenance is performed on the log file, it need not be the same types of database maintenance which are performed on the data file, e.g., an integrity check is performed on the log file, while defragging, reindexing, and an integrity check are performed on the data file. In such embodiments, a maintained version of the log file is created.

The database maintenance process can require time to accomplish, depending on the size of the data file and how long it has been since it was last maintained. In the example, in step 405, nine hours after the process begins, at 10:00, the offline maintenance completes. The result of the database maintenance step is a maintained snapshot copy which in this example is called Maintained File1'.

In step 407, the system dismounts DB1 from the overall database management system. By "dismount" it is meant that the one database is taken offline so that data write operations are no longer directed to the database. The dismounting process halts DB1 so that it can be updated safely, while allowing the database management system to operate other databases without interruption to continue normal operation and service requests. Further, by dismounting a database, the information storage commands directed to a particular group of databases are not stopped unless the database that is dismounted is the only database within the group.

In step 409, the system performs a snapshot restore operation using the maintained snapshot copy of the data file, Maintained File1' to replace the current production copy of the data file, File1. In preferred embodiments, the log file optionally captured in step 401, is not restored, as the production copy of log file, Log1, contains the transactions which occurred between 01:00 and 10:00, and is thus a more accurate source of the transactions performed on the database.

However, because Maintained File1' only contains the transactions which occurred up to the point in time the snapshot occurred, it must be brought up to date using the production log file, Log1. In step 411, the system applies the logged transactions from 01:00 to 10:00 sequentially in the order in which they occurred to the restored version of the maintained data file, Maintained File1'. Depending on how many transactions there are, this operation may take a few seconds to several minutes. In a preferred embodiment of the invention, roll forward technology is used to update the maintained snapshot. Roll-forward technology is typically used in the event of a system crash, that is, for recovery to restore a damaged database to the most recent state before a failure occurred, rather than for database maintenance of an operating database.

In the alternative embodiments in which database maintenance is performed on the log file, those transaction records which have been restored in the maintained version of the log file are applied to (reconciled with) Maintained File1', and then the more recent transaction records only available in the production copy of the log file are applied.

As shown in the figure, in step 413, the system remounts DB1 and resumes committing transactions to Database 1. The new production copy of DB1 is a derivative of the maintained snapshot copy of the data file, Maintained File1', and the active log file of the production database, Log 1.

In step 415, the new version of the production copy of the database is optionally backed up, either through another snapshot operation or another type of backup operation. At this point, the production database contains the completed maintenance changes. Typically, the database will be smaller, requiring less system resource and its performance will improve. It will also be a consistent, uncorrupted copy. The database may also be reindexed for faster operations. Any backup, or restore operation from the backup, will enjoy similar advantages.

In the illustrative embodiment, the production database is only offline between steps 407 and 413. This outage might only last a few seconds or minutes. The backup step 415, is optional, and therefore, one could save further time by its omission. However, if a backup of the database is needed in the case of a restore operation, one based on the new production copy will be much quicker than a backup using an existing database copy, because the database has been defragged, for example. Further, by backing up the database, the work of database maintenance will not need to be repeated in the event of a database crash.

Figure 5:
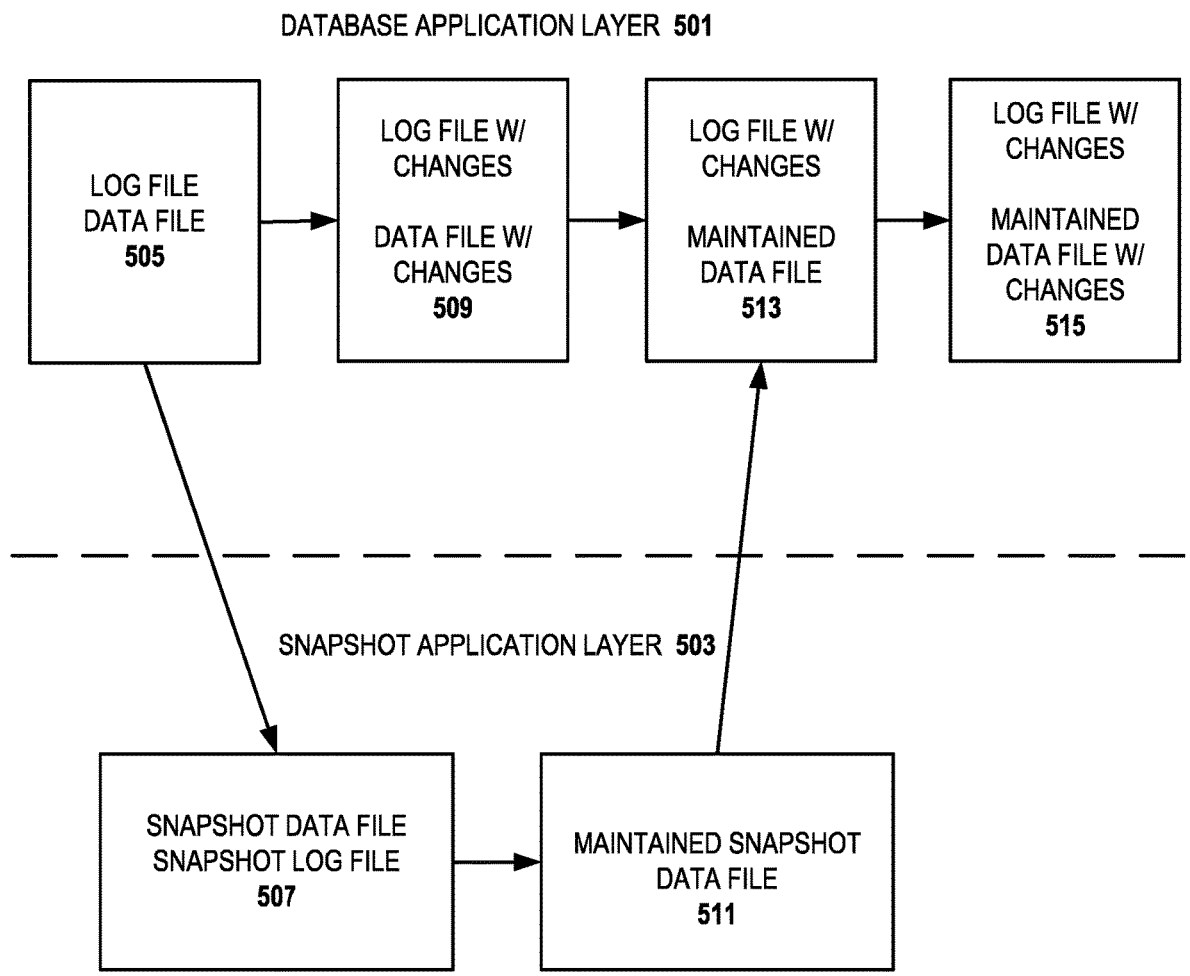
FIG. 5 is a flow diagram of the database maintenance process according to one preferred embodiment of the invention.

FIG. 5 shows a different representation of a preferred embodiment of the invention, showing the data files and log files as they are transferred between the production database application layer 501 and snapshot application layer 503 with the passage of time. For ease in illustration, a single data file and a single log file are depicted, although in other embodiments of the invention, the set of data files includes a plurality of data files and the the set of log files includes a plurality of log files. A set can include one file. The production database at the time of the snapshot 505 comprises Log File and Data File. The snapshot application creates snapshot copies 507 of the files, Snapshot Data File and Snapshot Log File. At the time of the snapshot, the Data File and the Snapshot Data File as well as the Log File and the Snapshot Log File contain the same information.

However, as the process proceeds, the two sets of files diverge in content and structure. The Log File and Data File in the production database application layer 509 are changed due to the transactions requested by the users of the database. Meanwhile, in one preferred embodiment, the Snapshot Log File is discarded while the Snapshot Data File undergoes database maintenance, e.g., defrag, reindexing, to improve the quality of the data file and to become the Maintained Snapshot Data File 511.

After the Maintained Snapshot Data File is created, the database is dismounted so that the Maintained Snapshot Data File can replace the production version of the data file. However, the Log File with the new transactions is retained 513. Next, the changes in the log file which occurred after the snapshot are applied to the Maintained Snapshot Data File (which is now the production data file) so that the maintained version of the data file can be brought up to date. At the end of the process, the Log File and the Maintained Data File 515 are consistent with the transactions requested by the users while database maintenance was taking place.

Those skilled in the art will recognize that many database systems have built-in snapshot capabilities, and thus, embodiments of the invention will have the snapshot utility integral to the database system. In other embodiments of the invention, the database system will issue commands to the snapshot and storage utilities to perform some of the operations of the invention.

The present invention has many advantages over the prior art. One of the benefits of the invention is a faster restore process by only restoring the data portion of the database and not restoring blank space. Database downtime during maintenance is reduced from hours to only seconds or minutes. Database errors are corrected without taking the database system offline. Individual databases can be dismounted to do maintenance. It is much faster to dismount and mount a database than to stop the database service. The other databases on the system stay online, and even the database that is dismounted is offline for a shorter period than if the administrator shut down the database system.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A method for performing database maintenance comprising:
providing a database running in a computer in a production environment in which the database is providing responses to user requests and logging changes, the database including a first data file and a first log file;
creating a snapshot copy of the first data file;
performing database maintenance on the snapshot copy of the first data file to produce a maintained snapshot copy of the first data file;
performing a snapshot restore operation on the database by replacing the first data file with the maintained snapshot copy of the first data file, the snapshot restore operation occurring on the database running in the computer in the production environment; and
updating the maintained snapshot copy of the first data file according to logged transactions including a most recent transaction in the first log file which occurred according to user requests while the database maintenance was being performed on the first snapshot copy to produce a new data file for the database, wherein the new data file is for an up to date version of the database.

2. The method as recited in claim 1, wherein user transaction requests are directed to the database running in the production environment and the first data file and the first log file in the database are changed according to user transaction requests without changing the first snapshot copy according to user transaction requests during database maintenance.

3. The method as recited in claim 2, further comprising:
creating a snapshot copy of the first log file;
performing database maintenance on the snapshot copy of the first log file to produce a maintained snapshot copy of the first log file; and
reconciling the maintained snapshot copy of the first data file according to logged transactions in the maintained snapshot of first log file, at least one of the logged transactions not present in the snapshot copy of the first data file, which occurred before the snapshot copy of the first data file was created.

4. The method as recited in claim 3, wherein the database maintenance performed on the first data file is different than the database maintenance performed on the first log file.

5. The method as recited in claim 1, further comprising responsive to creating the new file from the maintained snapshot copy and the logged transactions in the first log file, performing a backup of the new data file.

6. The method as recited in claim 1, further comprising:
dismounting the database after the maintained snapshot copy of the first data file is produced; and
mounting the database after the maintained snapshot copy of the first data file is updated according to logged transactions in the first log file.

7. The method as recited in claim 1, wherein a database management system issues commands to a snapshot application to create the snapshot copy of the first data file.

8. The method as recited in claim 1, wherein the first data file is comprised of a plurality of data files and the first log file is comprised of a plurality of log files.

9. Apparatus, comprising:
a processor;
computer memory holding computer program instructions executed by the processor for performing database maintenance, the computer program instructions comprising:
program code, operative to provide a database running in a computer in a production environment in which the database is providing responses to user requests and logging changes, the database including a first data file and a first log file;
program code, operative to create a snapshot copy of the first data file;
program code, operative to perform database maintenance on the first snapshot copy of the first data file to produce a maintained snapshot copy of the first data file;

program code, operative to perform a snapshot restore operation on the database by replacing the first data file with the maintained snapshot copy of the first data file, the snapshot restore operation occurring on the database running in the computer in the production environment; and program code, operative to update the maintained snapshot copy of the first data file according to logged transactions in the first log file including a most recent transaction which occurred according to user requests while the database maintenance was being performed on the first snapshot copy to produce a new data file for the database, wherein the new data file is for an up to date version of the database.

10. The apparatus as recited in claim 9, further comprising program code responsive to creating the new file from the maintained snapshot copy and the logged transactions in the first log file operative to perform a backup of the new data file.

11. The apparatus as recited in claim 9, wherein a snapshot application is used both for creating snapshots for database maintenance as well as snapshot for normal backup of the database.

12. The apparatus as recited in claim 9, further comprising:
   program code operative to dismount the database after the maintained snapshot copy of the first data file is produced; and
   program code operative to mount the database after the maintained snapshot copy of the first data file is updated according to logged transactions in the first log file.

13. The apparatus as recited in claim 12, wherein a database management system issues commands to a snapshot application to create the snapshot copy of the first data file, wherein the database management system and the snapshot application are resident on the same system.

14. The apparatus as recited in claim 9, further comprising:
   program code operative to create a snapshot copy of the first log file;
   program code operative to perform database maintenance on the snapshot copy of the first log file to produce a maintained snapshot copy of the first log file; and
   program code operative to reconcile the maintained snapshot copy of the first data file according to logged transactions in the maintained snapshot of first log file, at least one of the logged transactions not present in the snapshot copy of the first data file, which occurred before the snapshot copy of the first data file was created.

15. A computer program product including a non-transitory computer readable medium for use in a data processing system, the computer program product holding computer program instructions executed by the data processing system for performing database maintenance, the computer program instructions comprising:
   program code, operative to provide a database running in a computer in a production environment in which the database is providing responses to user requests and logging changes, the database including a first data file and a first log file;
   program code, operative to create a snapshot copy of the first data file;
   program code, operative to perform database maintenance on the first snapshot copy of the first data file to produce a maintained snapshot copy of the first data file;
   program code, operative to perform a snapshot restore operation on the database by replacing the first data file with the maintained snapshot copy of the first data the snapshot restore operation occurring on the database running in the computer in the production environment; and
   program code, operative to update the maintained snapshot copy of the first data file according to logged transactions including a most recent transaction in the first log file which occurred according to user requests while the database maintenance was being performed on the first snapshot copy to produce a new data file for the database, wherein the new data file is for an up to date version of the database.

16. The computer program product as recited in claim 15, further comprising program code, operative to create a snapshot copy of the first log file and program code, operative to discard a snapshot copy of the first log file.

17. The computer program product as recited in claim 15, further comprising computer code responsive to creating the new file from the maintained snapshot copy and the logged transactions in the first log file operative to perform a backup of the new data file.

18. The computer program product as recited in claim 15, further comprising:
   program code operative to dismount the database after the maintained snapshot copy of the first data file is produced; and
   program code operative to mount the database after the maintained snapshot copy of the first data file is updated according to logged transactions in the first log file.

19. The computer program product as recited in claim 15, further comprising:
   program code operative to create a snapshot copy of the first log file;
   program code operative to perform database maintenance on the snapshot copy of the first log file to produce a maintained snapshot copy of the first log file; and
   program code operative to reconcile the maintained snapshot copy of the first data file according to logged transactions in the maintained snapshot of first log file, at least one of the logged transactions are not present in the snapshot copy of the first data file, which occurred before the snapshot copy of the first data file was created.

20. The computer program product as recited in claim 15, further comprising a database management system operative to issue commands to a snapshot application to create the snapshot copy of the first data file.

* * * * *